March 1, 1932.　　　E. G. EMERY, JR　　　1,847,237

GUN MOUNT

Filed May 28, 1930

INVENTOR
ELLIOTT G. EMERY JR.
BY
*James Kinnan*
ATTORNEY

Patented Mar. 1, 1932

1,847,237

UNITED STATES PATENT OFFICE

ELLIOTT G. EMERY, JR., OF SEATTLE, WASHINGTON, ASSIGNOR TO BOEING AIRPLANE COMPANY, OF SEATTLE, WASHINGTON

GUN MOUNT

Application filed May 28, 1930. Serial No. 456,440.

This invention relates to improvements in gun mounts, and more especially to a mount for machine guns of the type used in military aircraft.

The invention has for one of its objects to provide a mount of this character wherein the reactions of the gun are carried through rigid channel members to the aircraft structure.

Another object of the invention is the provision of a mount of this character which is readily adaptable and conveniently interchangeable for supporting either a .30 caliber gun or a .50 caliber gun.

These and other objects will appear as my invention is more fully hereinafter described in the following specification, illustrated in the accompanying drawings, and finally pointed out in the appended claims.

Figure 1:
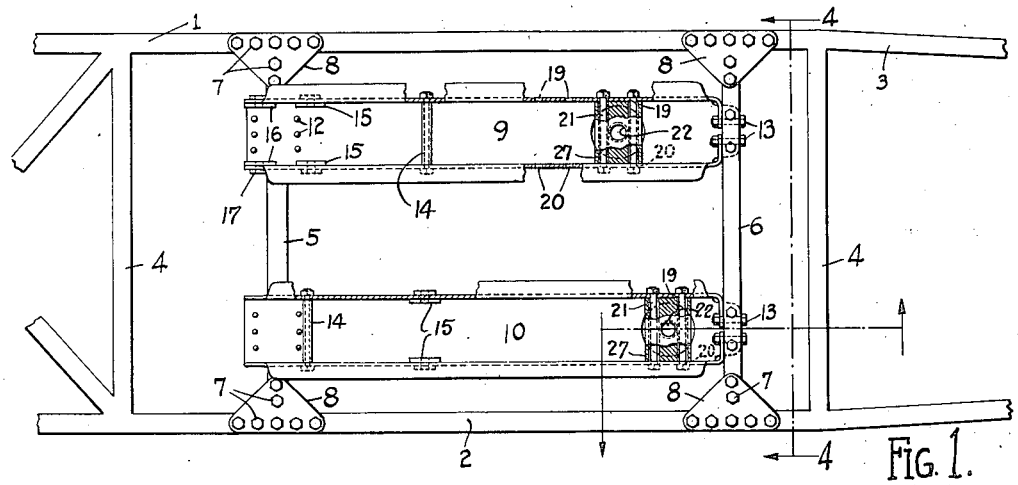
Figure 1 is a fragmentary plan view of an airplane fuselage showing my improved form of gun mount operatively installed thereon.
Figure 2:
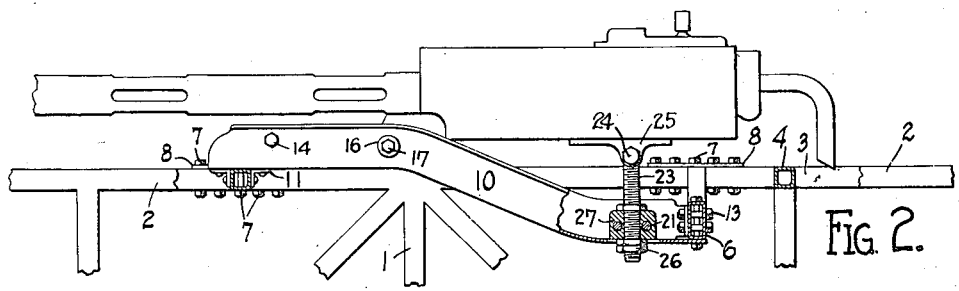
Figure 2 is a side elevation of Figure 1 showing a .30 caliber gun in place.
Figure 3:
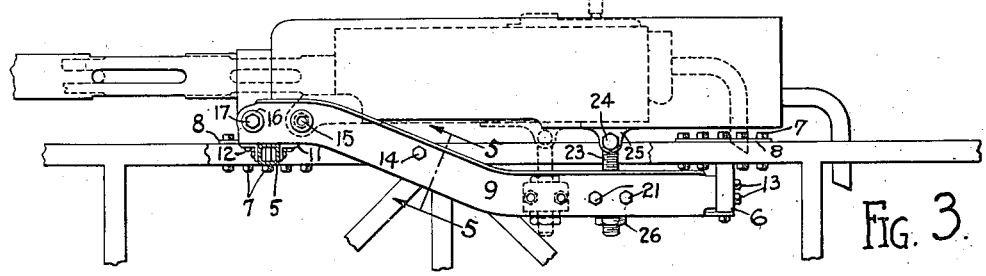
Figure 3 is a view similar to Figure 2 but showing the adaptability of a .50 caliber gun (in full lines) to the mount for the .30 caliber gun.
Figures 4, 5:
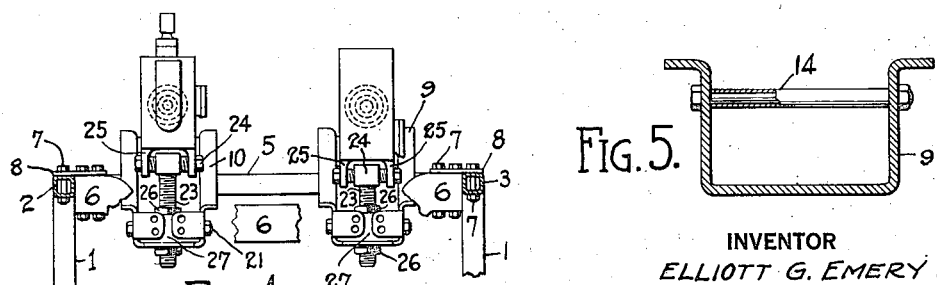
Figure 4 is a sectional end view taken on the line 4—4 of Figure 1.
Figure 5 is an enlarged sectional view of one of the channel members, taken on the line 5—5 of Figure 3.

Referring now more particularly to the drawings:

Reference numeral 1 indicates, generally, the fuselage of an airplane which consists of the usual longérons 2 and 3 and cross bracing members 4.

In one of the bays formed between the cross-bracing members in advance of the pilot's compartment, I have provided a pair of supports 5 and 6 which are secured to the longérons by means of bolts 7 and gusset plates 8. Channel members 9 and 10 extend from the support 5 to the support 6 and are secured thereto by any suitable means, such for instance, as brackets 11 and rivets 12 and bolts 13. Stiffening members 14 are provided at suitable points within the channels.

In Figure 1, two channel members are shown. The channel 9 is adapted to receive either the .30 or .50 caliber gun, while the channel 10 is adapted to receive only the .30 caliber gun.

The channel 9 is provided with two pairs of bushings 15 and 16 at its forward end. The bushings 16 are located to receive the forward supporting bolt 17 of the .50 caliber gun. The bushings 15 are located to receive the forward supporting bolt 18 of the .30 caliber gun. The opposite end of the channel 9 is formed with a series of apertures 19 and 20 to receive bolts 21 which carry a block 27. The block is centrally apertured and internally threaded as at 22 to receive an upright bolt 23 which supports the rear end of the gun by means of a cross member 24 which is secured to a pair of lugs 25 depending from the gun. Lock nuts 26 are provided for locking the bolt 23 in any of its vertically adjusted positions. By means of the apertures 19 and 20 the block 27 may be locked in either position to shorten or lengthen the distance from the forward bushings to accommodate either the .30 or .50 caliber gun.

In most cases military aircraft are provided with two .30 caliber guns, and in some instances it becomes necessary to equip them with one .50 caliber gun and one .30 caliber gun. With my invention therefore, it is possible to quickly and conveniently remove the .30 caliber gun and install in its place a .50 caliber gun without the trouble and inconvenience of removing the mount for the .30 caliber gun and replacing it with a mount to receive a .50 caliber gun.

While I have shown a particular embodiment of my invention, I am aware that changes therein will readily suggest themselves to others skilled in the art without departing from the spirit and scope of my invention. Having thus described the invention, what I claim as new and desire to protect by Letters Patent is:—

1. In a device of the class described the combination of an airplane fuselage, cross-bracing members extending transversely thereof, a pair of channel members secured to said supporting members, one of said channel members being formed with fixed means within its flanges for engagement with a machine gun, the other of said channel members being formed with adjustable means for engagement with machine guns of various lengths.

2. In combination with an airplane fuselage, two rigid, longitudinally-extending gun mounting members fixed upon said fuselage, fixed means associated with one of said members to engage and support a gun of given length, and means adjustably secured upon the other member for engaging a gun of like length, or alternatively, a gun of different length.

3. A gun mount for airplanes comprising a rigid member adapted to be fixed in the fuselage to extend longitudinally beneath the gun position, and apertured at its forward end, and at longitudinally spaced points, to receive the horizontal transverse supporting bolt of guns of different lengths, a nut adapted to receive the elevating screw of the gun of either length, and means to fix said nut in one of a plurality of positions lengthwise of said member, corresponding to the length of the gun to be mounted.

4. A gun mount for airplanes comprising a channel member having its flanges directed upward, means to fix said channel upon the fuselage, extending longitudinally, the flanges being apertured at spaced points near their forward end to receive the horizontal transverse supporting bolt of guns of various lengths, a nut adapted to receive the elevating screw of each gun, the flanges being apertured at spaced points near its rear end, and transverse bolts selectively received in certain of said rear apertures to secure the nut at different positions lengthwise of the channel, corresponding to guns of different lengths.

In testimony whereof I affix my signature.

ELLIOTT G. EMERY, Jr.